United States Patent [19]
Izumi

[11] Patent Number: 5,946,063
[45] Date of Patent: Aug. 31, 1999

[54] LIQUID CRYSTAL DISPLAY PANEL

[75] Inventor: Yoshihiro Izumi, Kashihara, Japan

[73] Assignee: Sharp Kabushiki Kaisha, Osaka, Japan

[21] Appl. No.: 08/948,662

[22] Filed: Oct. 10, 1997

[30] Foreign Application Priority Data

Oct. 28, 1996 [JP] Japan .................................... 8-285560

[51] Int. Cl.⁶ .......................... G02F 1/1343; G03F 1/133
[52] U.S. Cl. ................ 349/73; 349/39; 349/139
[58] Field of Search ................. 349/39, 73, 51, 349/139, 158

[56] References Cited

U.S. PATENT DOCUMENTS

| | | | |
|---|---|---|---|
| 5,526,149 | 6/1996 | Kanbe et al. | 349/139 |
| 5,615,028 | 3/1997 | Ishiguro et al. | 349/139 |
| 5,739,886 | 4/1998 | Shibahara | 349/139 |
| 5,751,381 | 5/1998 | Ono et al. | 349/139 |
| 5,812,226 | 9/1998 | Izumi et al. | 349/73 |
| 5,838,405 | 11/1998 | Izumi et al. | 349/73 |

Primary Examiner—William L. Sikes
Assistant Examiner—Dung Nguyen
Attorney, Agent, or Firm—Nixon & Vanderhye P.C.

[57] ABSTRACT

A liquid crystal display panel having an upsized display area of the present invention includes source wirings composed of a plurality of wiring sections, respective parts of which are connected to each other. At least one of the plurality of wiring sections is connected to a pixel electrode via an active element. The source wirings are arranged such that the plurality of wiring sections can be enclosed within a light shielding region. The described liquid crystal display panel suppresses an occurrence of a wiring disconnection inferior accompanying when upsizing the display area and improving a definition, and thus can be manufactured at a higher yield. It is preferable that the source wirings are arranged in a form of a ladder and are formed by laminating a plurality of electrically conductive films. It is also preferable that in the crossover where the gate wirings cross each other, at least a width of either one of the wirings is reduced. The described liquid crystal panel enables a quality display while suppressing an occurrence of a wiring disconnection.

25 Claims, 10 Drawing Sheets

LIQUID CRYSTAL DISPLAY PANEL

FIELD OF THE INVENTION

The present invention relates to a liquid crystal display panel for use in AV (Audio Visual) equipments or OA (Office Automation) equipments.

BACKGROUND OF THE INVENTION

As the society becomes more information oriented, there is an increasing demand for display devices of higher-definition and larger display area for AV equipments such as TVs, monitors for OA equipments. Examples of such display devices include CRTs (Cathode-Ray Tube) displays, LCDs (Liquid Crystal Display), plasma displays, EL (Electro Luminescent) displays, LED (Light Emitting Diode) displays, etc.

For the described display devices, developments of a larger display area have been made for practical applications. However, as the display area of the display device is upsized, an accompanying increase in weight, size and power consumption of the display device is expected. Therefore, when upsizing display area, efforts to achieve characteristics of lighter weight, thinner and lower power consumption are required at the same time.

Among the described display devices, the use of the liquid crystal displays has achieved wide-spread acceptance in a variety of applications in various fields recently. The LCDs have an advantage over other display devices in that they can be installed even in a small space with ease because of its beneficial characteristic of lighter and thinner structure compared with other display devices and requires small power consumption. Moreover, as the LCDs are evolvable into full-color display with ease, they can be suitably applied to display devices of a large-sized display area such as large-sized monitors, wall hung type display devices. Thus, the LCDs are the best candidate for large-sized display area.

However, when an attempt is made to upsize the display area of the liquid crystal display, or improve the resolution, the LCDs have the following drawbacks:

①  A cost of the LCDs increases as the yield is lowered due to a disconnection of a signal line, pixel defect, etc., experienced in the manufacturing processes; and ② Even when adopting the active matrix driving system which shows an excellent response characteristic, a significant delay in a gate signal can not be avoided, which definitely impairs display performances.

As a solution to the described problem ①, a method of realizing a large-sized display area by adopting one large LCD panel prepared by connecting a plurality of LCD panels have been proposed. For example, inventors of the present application proposes a liquid crystal display device (Japanese Unexamined Patent Publication No. 122769/1996 (Tokukaihei 8-122769)) which adopts a liquid crystal display panel of a new multi-panel system in which joints of panels are not noticeable. The described liquid crystal display panel realizes LCDs which permit a natural image to be displayed on a large display area at low cost.

On the other hand, as a solution to the described problem ②, a method of reducing the resistance of the gate wirings by increasing the film thickness of the gate wirings has been proposed. For example, in the case of liquid crystal display panels for notebook type PCs, the film thickness of the gate wiring is increased from around 0.3 $\mu$m to not less than 0.5 $\mu$m. By increasing the film thickness of the gate wirings in the described manner, a delay in signal can be suppressed.

The method of increasing the film thickness of the gate wirings will be explained in detail.

Figure 8:
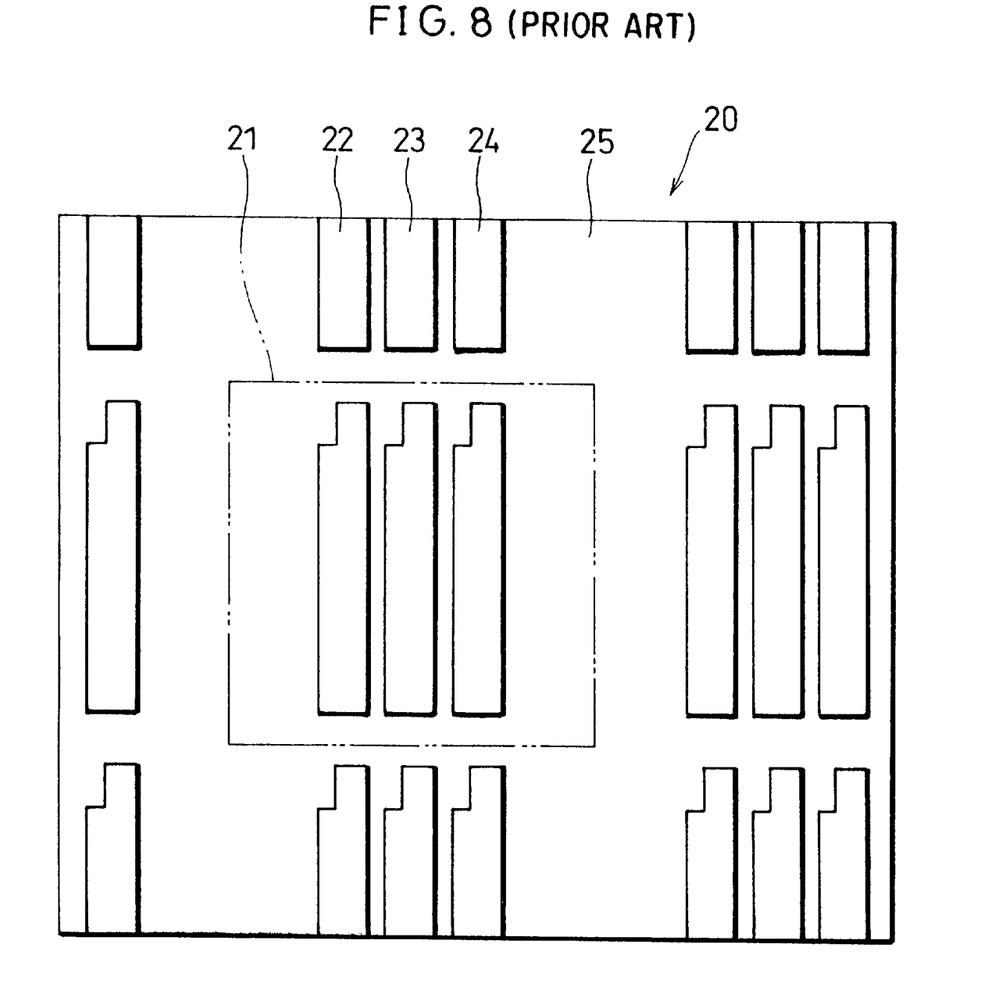
FIG. 8 is a partially enlarged view showing the color filter substrate of the conventional liquid crystal display panel.

For example, as shown in FIG. 8, each display pixel 21 of a color liquid crystal display panel 20 is composed of three sub-pixels, i.e., a red pixel 22, a green pixel 23 and a blue pixel 24. Each sub-pixel is formed by laminating a pixel electrode formed on an active matrix substrate (to be described later) and a color filter formed on the color filter substrate to be fit in a shape of the pixel electrode in each color.

The active matrix substrate is prepared by forming an active element on a transparent substrate. On the other hand, the color filter substrate is prepared by forming a color filter, etc., on the transparent substrate so as to face the active matrix substrate as in the case of the active matrix substrate.

Between the active matrix substrate and the color filter substrate which constitute the liquid crystal panel 20, a liquid crystal is sealed. The color of each display pixel 21 is determined by adjusting a light transmitting through the liquid crystal. Each sub-pixel is enclosed by a black matrix 25 to prevent light from entering therein from other regions. On the other hand, to allow a transmissive light to be transmitted therethrough without being disturbed, gate wirings and source wirings are formed with respect to TFT (Thin Film Transistor) element which is the active element for driving the pixel electrode.

Figure 9:
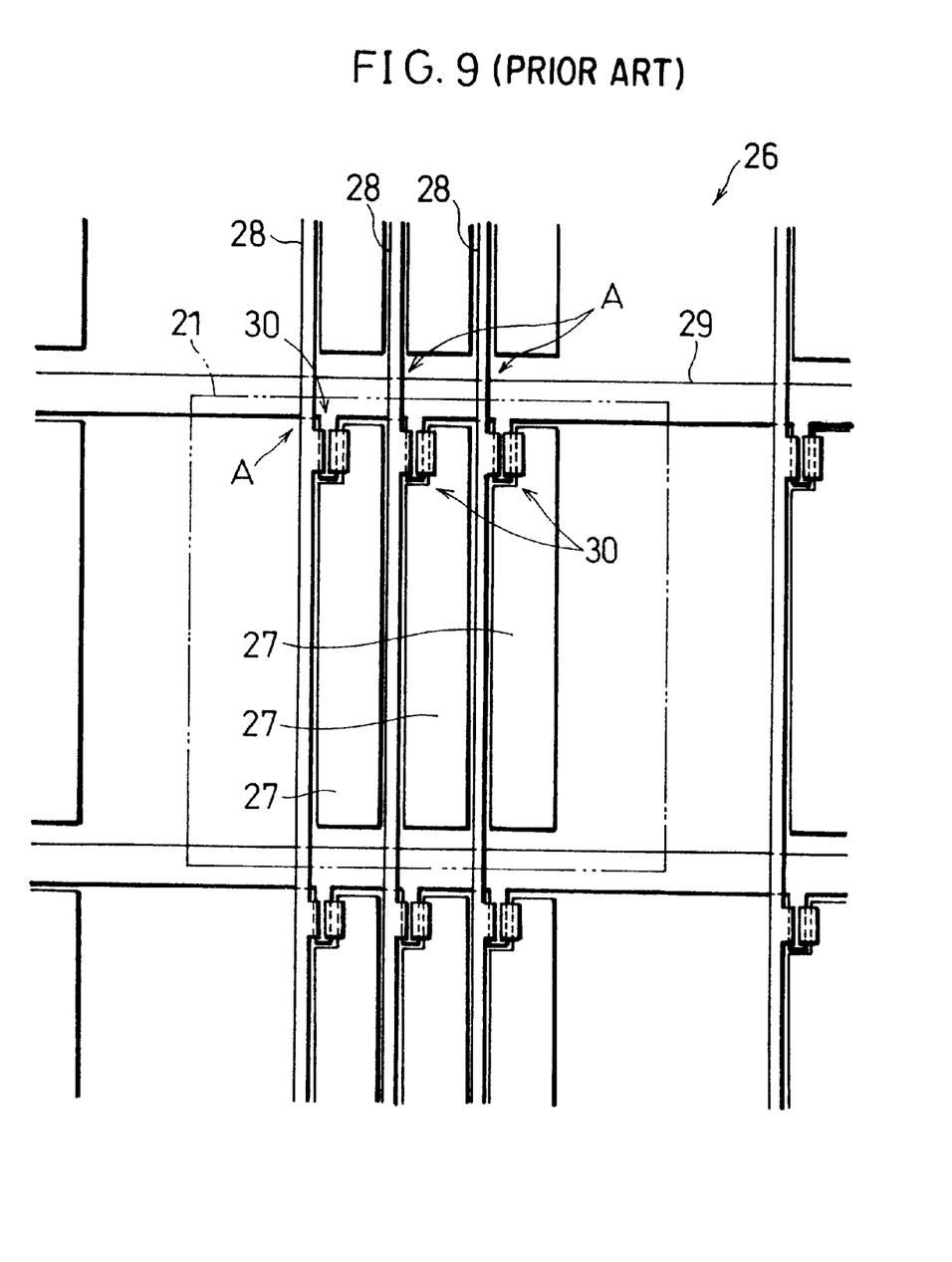
FIG. 9 is a view schematically showing a wiring pattern of a conventional TFT substrate with respect to the arrangement of the liquid crystal display panel of FIG. 8.
Figure 10:
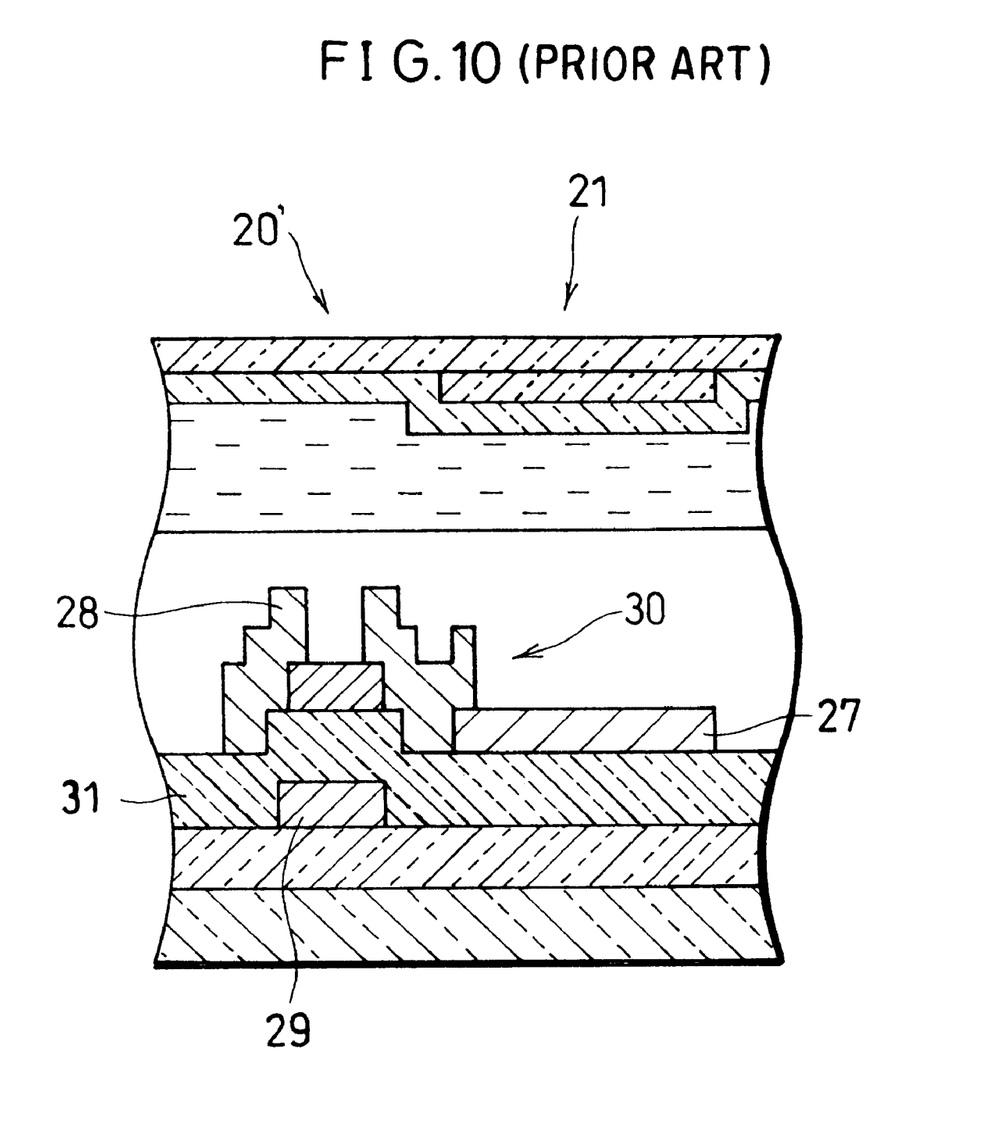
FIG. 10 is a cross-sectional view schematically showing a structure of a display pixel in the conventional liquid crystal display panel.

The display pixel 21 of the liquid crystal display panel 20 as shown in FIG. 8 is constituted by a wiring pattern of the active matrix substrate (hereinafter referred to as a TFT substrate) 26 as shown in FIG. 9. The TFT substrate 26 is placed so as to face the color filter substrate, and the TFT element is formed as an active element.

Each pixel electrode 27 provided for each color formed on the TFT substrate 26 is enclosed by a source wiring 28 for supplying a data signal to the pixel electrode 27, and a gate wiring 29. It is controlled such that the pixel electrode 27 is driven by a TFT element 30 provided in a vicinity of a crossover A between the source wirings 28 and the gate wirings 29.

The source wiring 28 and the gate wiring 29 cross at the crossover A via a gate insulating film 31 (to be described later). For example, in the case of a liquid crystal display panel 20a wherein the TFT element 30 of the display pixel 21 has an inverse stagger structure, a gate insulating film 31 is formed on the gate wiring 29, whereon the source wiring 28 crosses via the gate insulating film 31.

As described, when an attempt is made to increase the film thickness of the gate wiring 29 to prevent a delay in the gate signal, a level difference of the source wiring 28 at the crossover A becomes greater, thereby presenting the problem that a wiring disconnection of the source wiring 28 occurs at the crossover A at a higher rate.

Here, the film thickness of the gate wiring 29 is increased according to the size of the entire liquid crystal display panel as a final product. Therefore, the described problem of a higher rate of the wiring disconnection arises not only when realizing liquid crystal display panels of an upsized display area by a piece of large panel, but also when realizing them using the multi-panel system. Therefore, a higher rate of wiring disconnection cannot be avoided when upsizing the LCD panel.

Additionally, for not only the upsized LCD panels but also for many LCD panels, the redundant structure which permit the disconnection inferior of the source wiring 28 to be fixed by a projection of a laser beam has been generally adopted. However, the such redundant structure has the drawbacks in that the number of the source wirings that can be fixed is limited, or a cost increases due to an increase in the number of parts to be fixed by a projection of a laser beam. Therefore, the described LCD panels of a large display area which has quite a few number of display pixels does not offer a fundamental solution to prevent a disconnection of the source wiring 28.

SUMMARY OF THE INVENTION

The present invention is achieved in finding a solution to the described problem, and it is therefore an object of the present invention to provide a liquid crystal display panel which realizes an upsized display area while suppressing an accompanying problem of a disconnection of source wirings.

To fulfill at least the above-mentioned object, an example liquid crystal display panel in accordance with the best presently contemplated embodiment of the present invention is characterized by including:

a pair of transparent substrates placed so as to face each other;

a plurality of pixel electrodes formed on one of the pair of transparent substrates;

a light shielding section formed so as to surround each of the plurality of pixel electrodes;

a plurality of active elements connected to the plurality of pixel electrodes respectively;

source wirings composed of a plurality of wiring sections, respective parts of which being connected to each other, at least one of the plurality of wiring sections being connected to a pixel electrode via an active element, the plurality of wiring sections being enclosed within an area of the light shielding section; and gate wirings formed so as to cross the source wirings, the gate wirings being connected to the pixel electrodes via the active elements respectively.

According to the described arrangement, with respect to the active elements such as TFT elements, a data signal is supplied through a plurality of paths. As this permits a high redundancy of the source wirings, an occurrence of a disconnection of the source wiring can be significantly decreased. Moreover, as the source wirings are formed within the area of the light shielding section so as not to be overlapped with respective opening sections of the pixel electrodes, a reduction in aperture ratio can be avoided at the same time.

For example, in the case where the cross-sectional area of the source wirings is increased by increasing the film thickness of the source wirings to prevent an accompanying problem of a delay in signal when upsizing the display area of the LCD panels. Here, it is likely that a disconnection occurs at the crossover where the source wiring and the gate wiring cross each other. Moreover, when an attempt is made to achieve a high resolution at the same time, the yield of the LCD panels as a whole is lowered due to the disconnection of the wirings. In the present invention, by adopting the described structure of high redundancy, an occurrence of the source wiring disconnection can be suppressed.

According to the described arrangement, even if a disconnection occurs in one path, a data signal can be supplied to the active element using another path. Therefore, the LCD panels of an upsized display area can be realized while suppressing an occurrence of the source wiring disconnection inferior, and thus such LCD panels can be manufactured at higher yield. Moreover, as the source wirings are not formed in the opening sections, a significant reduction in aperture ratio can be avoided.

In order to achieve the above object, another liquid crystal display panel in accordance with the present invention is characterized by including:

a pair of transparent substrates placed so as to face each other;

a plurality of pixel electrodes formed on one of the pair of transparent substrates;

a light shielding section formed so as to surround each of the plurality of pixel electrodes;

a plurality of active elements connected to the plurality of pixel electrodes respectively;

source wirings composed of a plurality of wiring sections, respective parts of which being connected to each other, at least one of the plurality of wiring sections being connected to a pixel electrode via an active element, the plurality of wiring sections being enclosed within an area of the light shielding section; and gate wirings formed so as to cross the source wirings, the gate wirings being connected to the pixel electrodes via the active elements respectively, wherein the plurality of active matrix type liquid crystal panels are connected adjacently side to side on a plane to form one large-sized panel.

The described liquid crystal display panel adopts a method of upsizing a display area by connecting a plurality of liquid crystal panels. This method offers a relatively large area of the light shielding section and a higher degree of freedom in the arrangement of the source wirings. As a result, the source wirings can be arranged so as to be composed of a plurality of source wiring sections respective parts of which are connected to each other with ease. Furthermore, the liquid crystal panels having an upsized display area can be manufactured at an improved yield.

For a fuller understanding of the nature and advantages of the invention, reference should be made to the ensuing detailed description taken in conjunction with the accompanying drawings.

BRIEF DESCRIPTION OF THE DRAWINGS

FIG. 2(*a*) is an explanatory view showing two liquid crystal panels which are placed adjacently side to side on a plane;

FIG. 2(*b*) is an explanatory view showing an arrangement wherein two liquid crystal panels are connected to form one liquid crystal display panel of FIG. 2(*a*);

DESCRIPTION OF THE EMBODIMENTS

First Embodiment

In reference to FIG. 1 through FIG. 4, the following descriptions will explain a liquid crystal display panel whose display area is doubled by connecting two liquid crystal panels in accordance with one embodiment of the present invention.

Figure 2A:
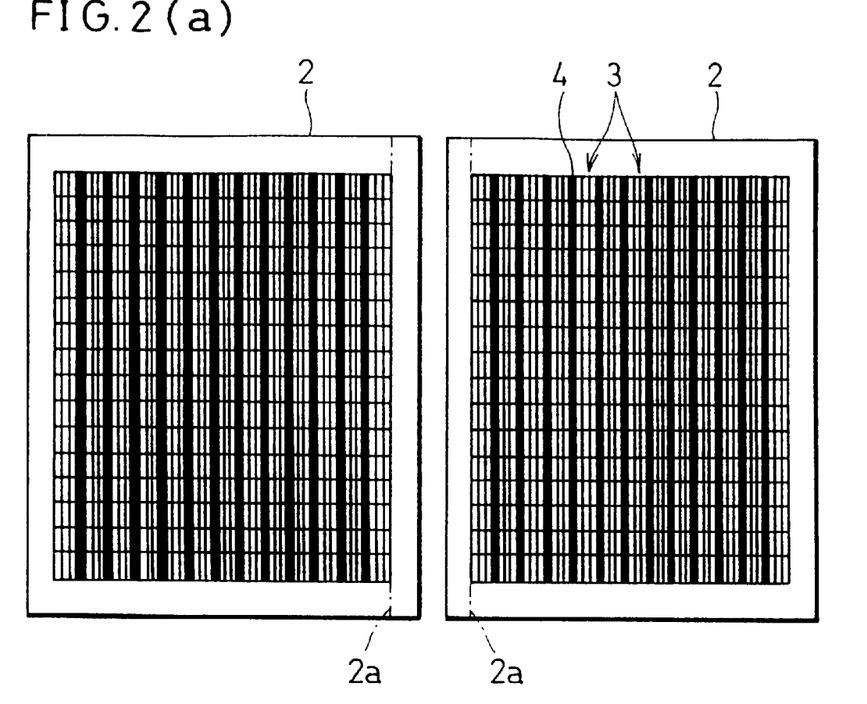
Figure 2B:
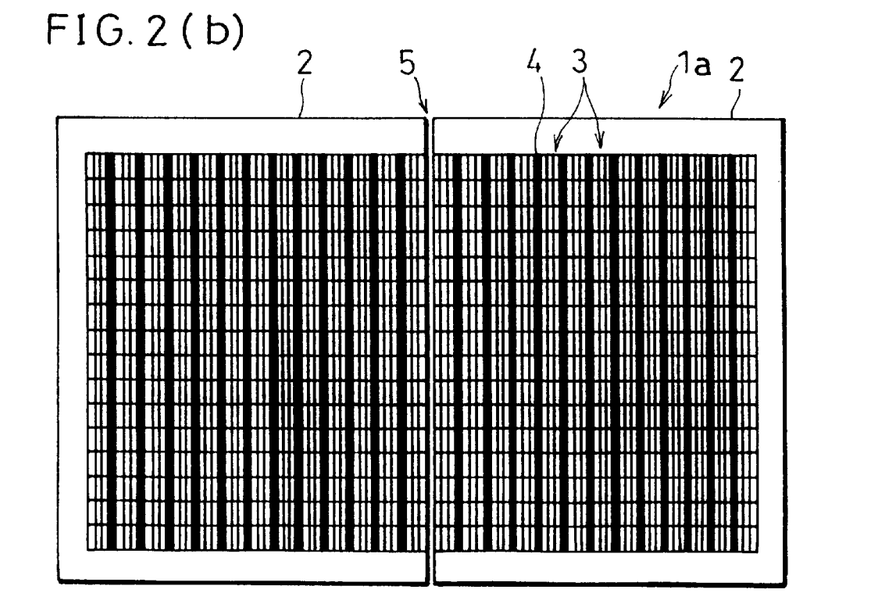

Specifically, as shown in FIG. 2(a), 20-inch active matrix-type liquid crystal panels (hereinafter referred to as a liquid crystal panels) 2 parted by a parting line 2a are adopted. As shown in FIG. 2(b), the liquid crystal panels 2 are placed adjacently on a plane of a large-sized substrate, and are connected side to side to form a large-sized panel 1a, thereby forming a 28-inch size active matrix type liquid crystal display panel (hereinafter referred to as a liquid crystal display panel) 1.

As active elements for use in the liquid crystal panel 2, TFT (Thin Film Transistor) elements are adopted. However, other active elements may be adopted as well such as MIM (Metal Insulator Metal) elements, etc.

On appearance, the liquid crystal panel 2 is arranged such that each display element 3 is separated by a black matrix 4 which serves as a light shielding section attached to the liquid crystal panels 2, and is separated according to each color of R (red), B(green) and G(blue). Then, an interval of a joint 5 at which the two liquid crystal panels 2 are connected adjacently is selected to be equivalent to an interval between the display pixels 3 of the liquid crystal panel 2.

Figure 3:
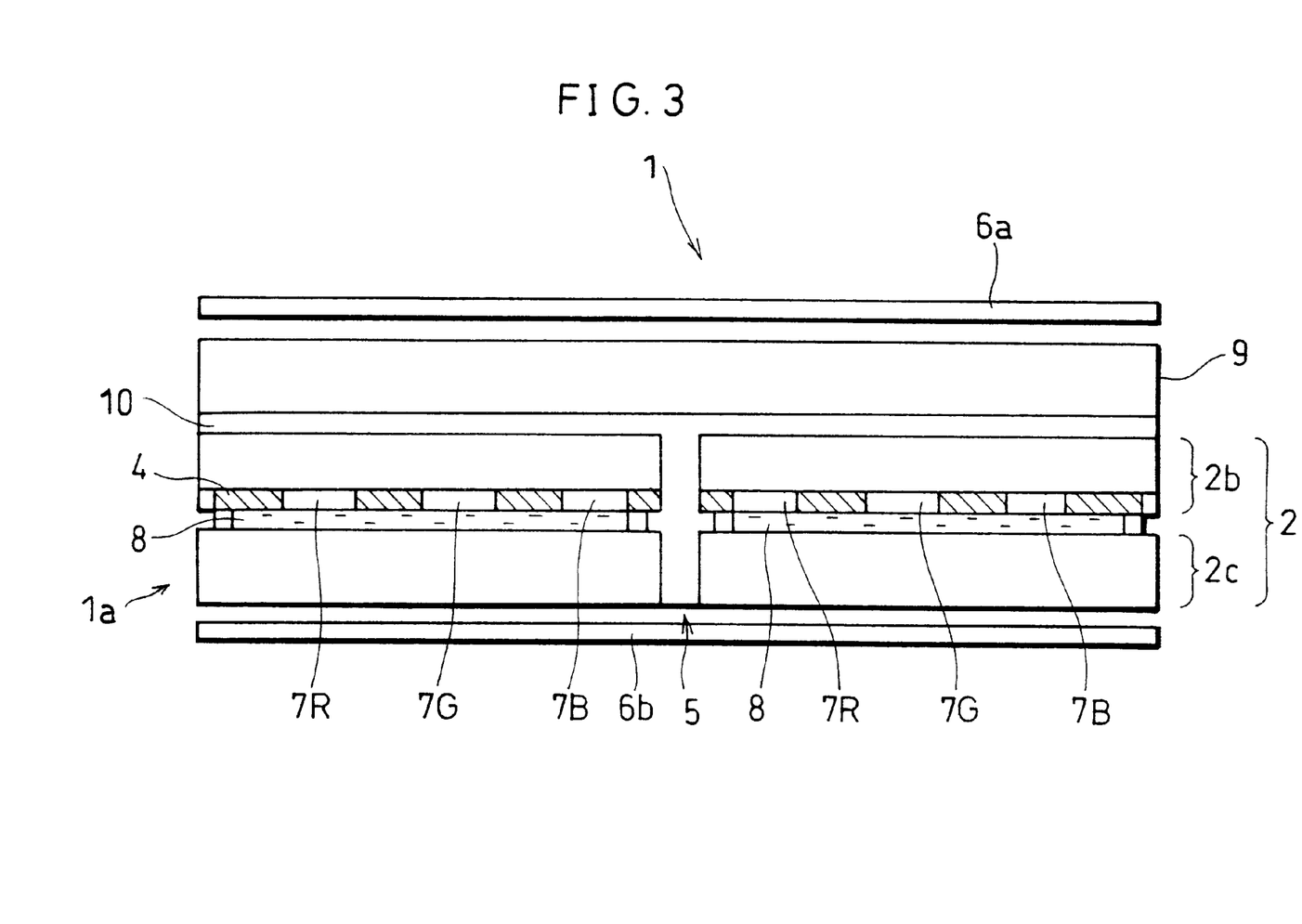
FIG. 3 is a cross-sectional view schematically showing a joint of the liquid crystal display panels of FIG. 2(*b*)

As shown in FIG. 3, the liquid crystal display panel 1 has the large-sized panel 1a prepared by fixing the liquid crystal panels 2 as connected to a reinforcing substrate 9 by a transparent bonding agent layer 10. Namely, the transparent bonding agent layer 10 is formed on at least one of the large-sized panel 1a, and the reinforcing substrate 9 is laminated on the large-sized panel 1a via the bonding agent layer 10.

The pair of polarization plates 6a and 6b is formed on respective surfaces of the large-sized panel 1a so as to cover the entire surface on which the reinforcing substrate 9 is laminated. The pair of polarization plates 6a and 6b is formed on respective surfaces of the large-sized panel 1a (the crossed Nicol position) so that respective polarization axes cross at right angle. Therefore, even if a clearance is formed at the joint 5 between the liquid crystal panels 2, through which light may leak, as the polarization plates 6a and 6b are in the cross Nicol state, a light transmitting through the joint 5 is blocked. As a result, the joint 5 does not stand out.

The reinforcing substrate 9 may be laminated on either one of the surfaces of the large-sized panel 1a, or on both surfaces. Here, if the joint 5 of the liquid crystal panels 2 of the large-sized panel 1a has a sufficient strength, it is not necessary to laminate the reinforcing substrate 9.

Furthermore, in the black matrix 4 formed on the liquid crystal panel 2, a black material is used. Therefore, the surface reflection by the black matrix 4 is hardly observed, and thus the joint 5 does not stand out on the screen.

The liquid crystal panel 2 is arranged such that a color filter substrate 2b and a TFT substrate 2c (a pair of light transmissive substrates) are placed so as to face each other, and a liquid crystal 8 is sealed between them. The color filters 7R, 7G, and 7B formed in respective areas in the matrix so as to correspond to pixel electrodes for respective colors, the black matrix 4 and the counter electrodes, etc., are formed on the color filter substrate 2b. On the other hand, TFT elements, the pixel electrodes, the source wirings, the gate wirings, etc., are formed on the TFT substrate 2c.

For the TFT elements, electric field effect type TFT elements made of amorphous Si are used, and for the pixel electrodes, transparent pixel electrodes made of ITO (indium tin oxide) which has an excellent electrical conductivity are used.

Figure 4:
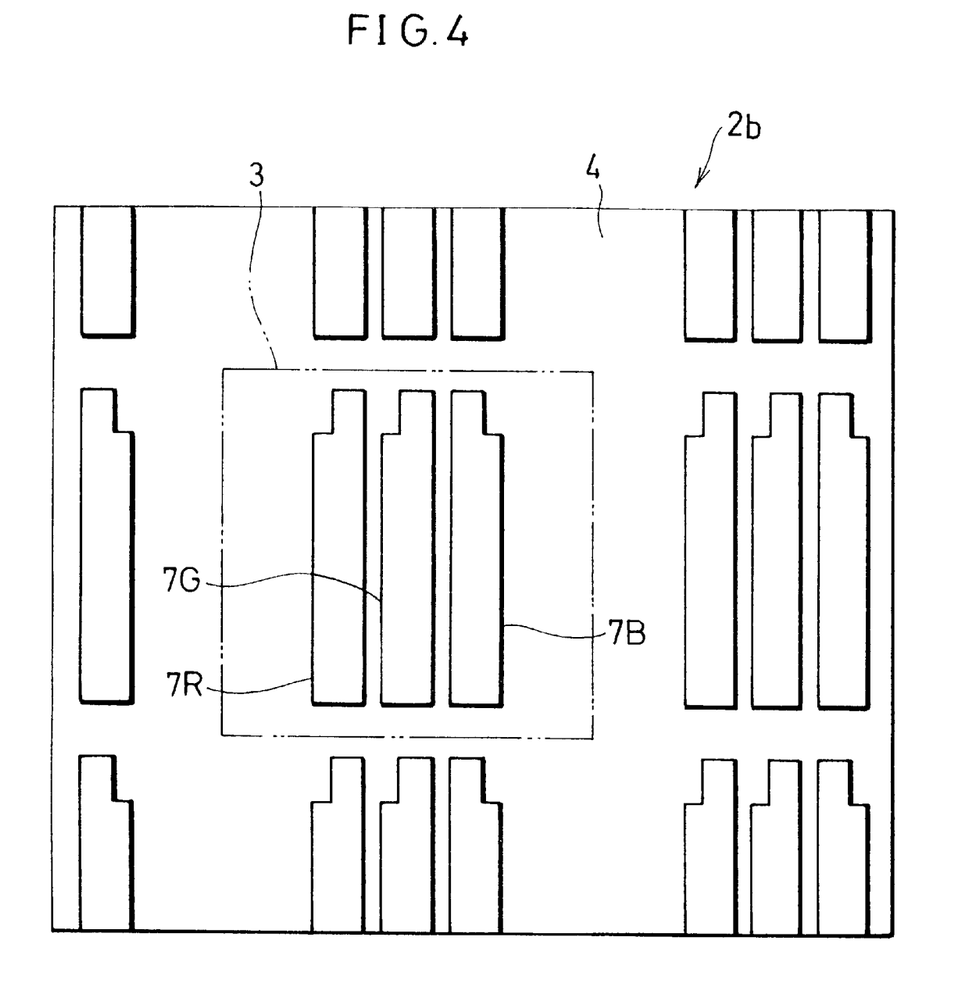
FIG. 4 is a partially enlarged view showing a color filter substrate of the liquid crystal display panel of FIG. 2(*b*)

As shown in FIG. 4, in the color filter substrate 2b, color filters 7R, 7G and 7B for respective colors are formed to substantially fit the shapes of the pixel electrodes respectively. The display pixel 3 is constituted by the color filters 7R, 7G and 7B. Other regions than the pixel electrodes in the TFT substrate 2c of the display pixel 3 are enclosed by the black matrix 4.

Figure 1:
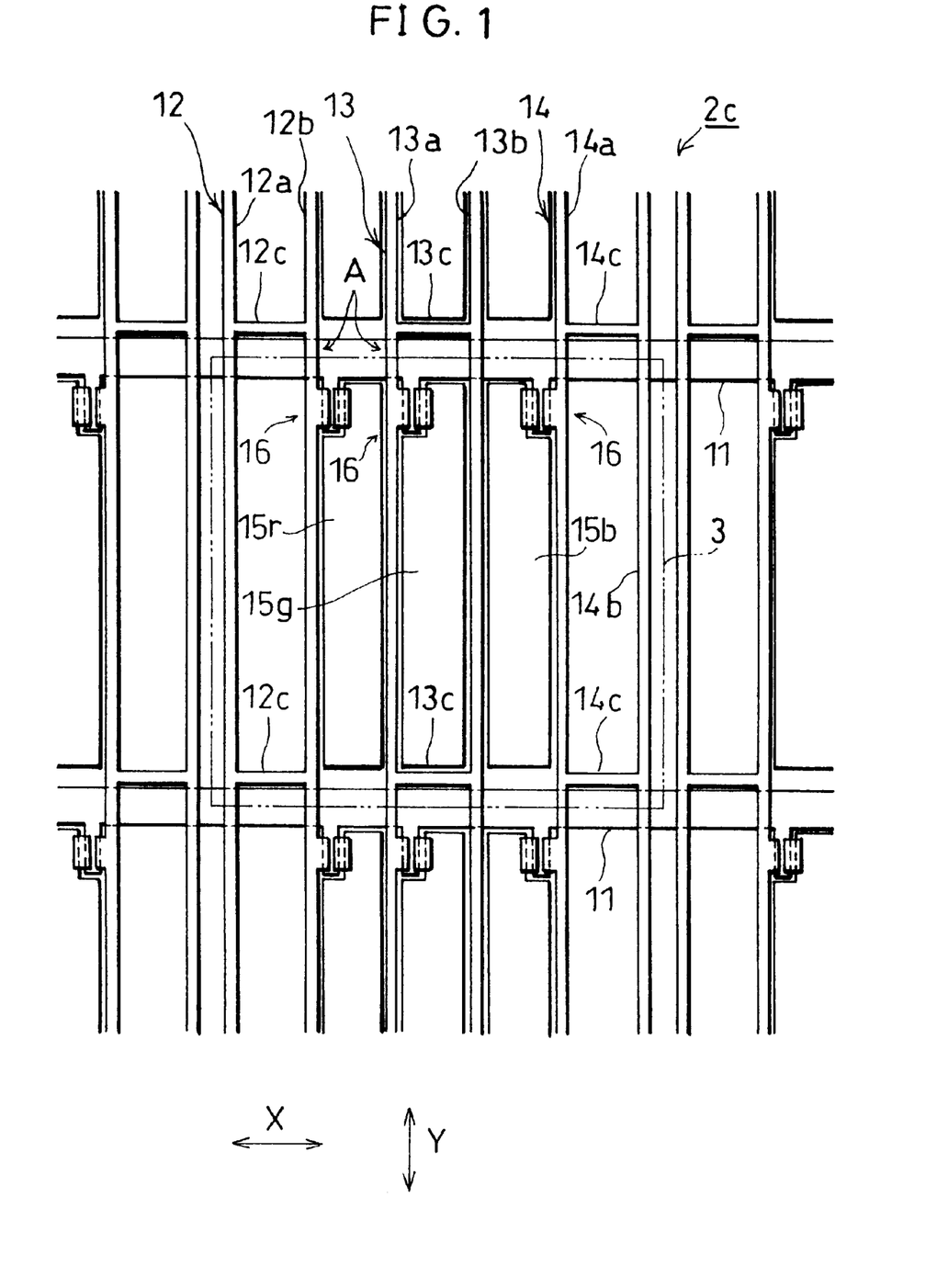
FIG. 1 is a view schematically showing a wiring pattern of a TFT substrate of a liquid crystal panel in accordance with one embodiment of the present invention.

As shown in FIG. 1, in the TFT substrate 2c, for each display element 3, a single gate wiring 11, and source wirings 12, 13 and 14 in respective colors (R, G and B) are formed. As a material for the gate wiring 11 and the source wirings 12, 13 and 14, α-Ta is used.

The gate wiring 11 has a thickness of 0.5 $\mu$m, and is formed parallel to the direction shown by an allow X in FIG. 1. Each of the source wirings 12, 13 and 14 has a thickness of 0.3 $\mu$m, and is formed parallel to the direction shown by an arrow Y orthogonal to the direction of an arrow X.

In a vicinity of respective crossovers A between the gate wiring 11 and the source wirings 12, 13 and 14, TFT elements 16 and pixel electrodes 15 (15r, 15g and 15b) are formed respectively. The TFT element 16 has a function of controlling a supply of an image signal for each color with respect to the pixel electrode 15.

The gate wiring 11 is connected to the pixel electrode 15r via the TFT element 16. As will be described later, the source wirings 12, 13 and 14 are respectively composed of a plurality of wiring sections, and at least one of the plurality of wiring sections is connected to the pixel electrode 15r via the TFT element 16.

In the case where the liquid crystal display panel 1 having the described arrangement has a large display area of not less than 20 inch size, the display pixel 3 has a relatively large area. As this allows the black matrix 4 that serves as a light shielding section placed so as to enclose each pixel electrode 15 to be made wider, as shown in FIG. 4, the higher degree of freedom in the arrangement of the wirings on the TFT substrate 22c can be achieved.

Especially, as the liquid crystal display panel 1 includes a large-sized panel 1a obtained by connecting two liquid crystal panels 2, it is required to set a pixel pitch, i.e., an interval of the display pixels 3 at the joint 5 in accordance with the pixel pitch of the liquid crystal panel 2. This is because if the pixel pitch at the joint 5 differs from the pixel pitch in other regions, the joint 5 becomes noticeable.

Therefore, in the liquid crystal display panel 1, it is required that the width of the joint 5 be selected to be not more than the width of the pixel pitch of the liquid crystal panel 2. By adopting the described arrangement of the joint 5, the width of the joint 5 can be set to the same width of the pixel pitch. As this permits a wider black matrix 4 to be formed, a still more improved degree of freedom in the arrangement of wirings can be achieved.

Among the wirings of the liquid crystal display panel 1, as shown in FIG. 1, the source wirings 12, 13 and 14 are respectively arranged in a form of a ladder within a region of the black matrix 4. First, the source wiring 12 for supplying a signal to the pixel electrode 15r will be explained. The source wiring 12 is arranged such that with respect to source wiring sections 12a and 12b formed parallel to and on the left hand side of the pixel electrode 15r, a plurality of connecting members 12c which connect respective parts of the wiring sections 12a and 12b are formed.

The source wiring 13 provided for supplying a signal to the pixel electrode 15g will be explained. The source wiring 13 is arranged such that with respect to source wiring sections 13a and 13b formed parallel to and on both sides of the pixel electrode 15g, a plurality of connecting members 13c which connect respective parts of the source wiring sections 13a and 13b are formed.

Further, the source wiring 14 for supplying a signal to the pixel electrode 15b will be explained. The source wiring 14 is arranged such that with respect to source wiring sections 14a and 14b formed parallel to and on the right hand side of the pixel electrode 15b, a plurality of connecting members 14c which connect respective parts of the source wiring sections 14a and 14b are formed.

Figure 5:
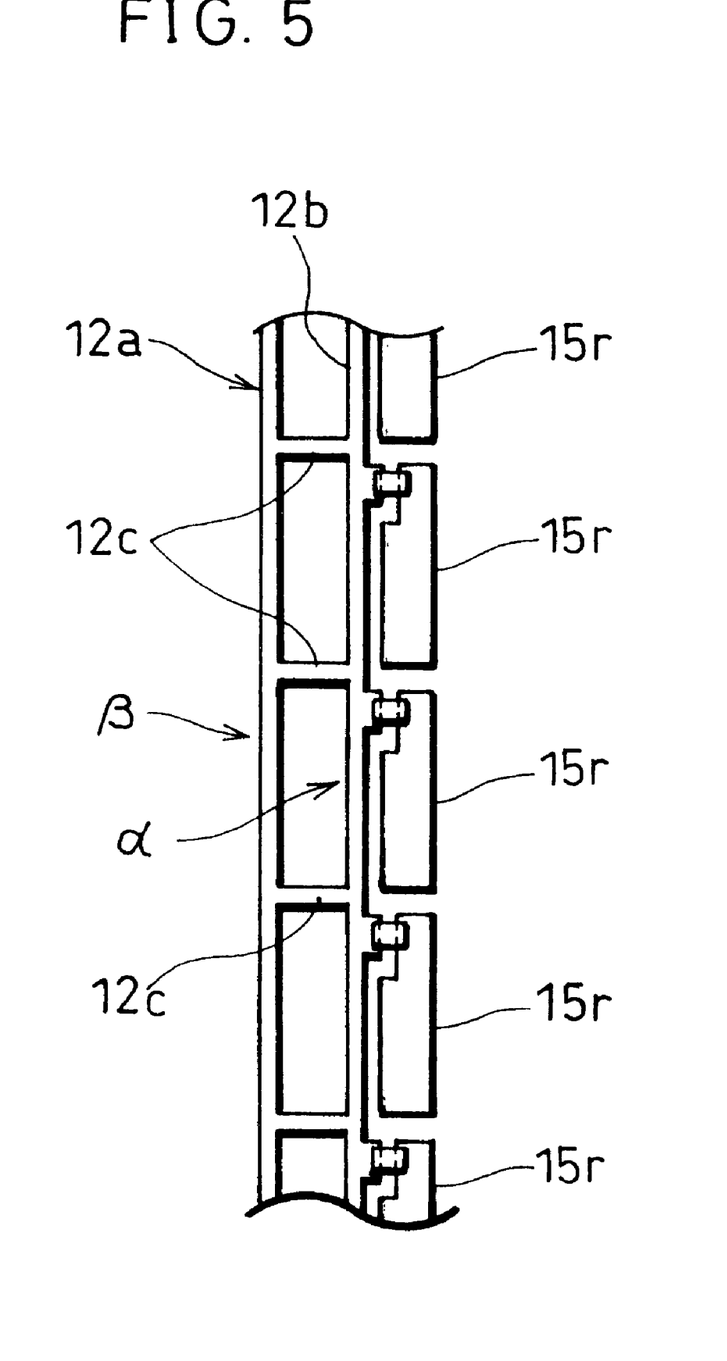
FIG. 5 is a partially enlarged view showing a state were a disconnection occurs in source wirings which are arranged in a form of a ladder.

In respective structures of the source wirings 12, 13 and 14, for example, as shown in FIG. 5, assume that a disconnection occurs in one portion of the source wiring section 12b (see the legend α) for supplying a data signal to the pixel electrode 15r. The described arrangement permits a data signal to be supplied to the source wiring section 12a with respect to the pixel electrode 15r which is positioned behind the disconnected part. Therefore, in the described source wiring 12 as a whole, a conductivity from an input side to an output side is not affected.

Next, the case where a plurality of disconnections occur on the source wiring 12 will be considered. Unless a disconnection occurs simultaneously also on the other source wiring 12a (legend β) sandwiched between the same connecting member 12c, the source wiring 12 as a whole is not adversely affected. In either of the pixel electrodes 15g or 15b, as respective source wirings 13 and 14 are arranged in a form of a ladder, the same mechanism can be applied as the source wiring 12. As described, by arranging the source wirings 12, 13 and 14 in a form of a ladder, an occurrence of a disconnection can be significantly reduced in the source wirings 12, 13 and 14.

In the case of preparing a liquid crystal display panel 1 having a large display area like the present embodiment, it is considered to increase the thickness of the gate wiring 11 in order to prevent a delay in signal. However, when the thickness of the gate wiring increases, due to a resulting increase in level difference, an increase in the occurrence of the disconnection in the source wirings 12, 13 and 14 is expected. However, as the described arrangement suppresses an occurrence of the disconnection inferior, an increase in the disconnection inferior as a whole can be suppressed.

As in the conventional liquid crystal panel, in the liquid crystal panel 2 in accordance with the present embodiment, the source wirings 12, 13 and 14 are arranged in a form of a ladder within the region of the black matrix 4. Therefore, the respective shapes of the source wirings 12, 13 and 14 do not adversely affect the display performances of the liquid crystal display panel 1.

For the gate wiring 11 and the source wirings 12, 13 and 14, a metal such as Al, Cu, etc., may be adopted other than α-Ta. However, it is not necessary to form a plurality of wiring sections in the source wiring by a metal film, and, for example, the wiring sections may have a laminated film structure of a metal film and a plurality of other conductive films (for example, ITO, etc.,). As a result, an occurrence of a disconnection inferior can be still suppressed as an electrical conduction can be achieved in other electrically conductive films even if a disconnection occurs in either of the metal film and the other electrically conductive film. Namely, as the redundancy of the wirings in a form of a ladder is added to the redundancy of the wirings in the laminated structure, a still more improved redundancy can be achieved.

In the liquid crystal display panel 1 in accordance with the present embodiment, ITO is adopted as another electrically conductive film to be laminated on the metal film. Namely, a plurality of electrically conductive films are made of the same material as the pixel electrode 15. By adopting ITO that is the same material as the pixel electrode 15, the electrically conductive films may be manufactured simultaneously when manufacturing the pixel electrodes without increasing the number of processes. Further, as long as an adverse effect on manufacturing processes of the liquid crystal display panel 1 or a quality of the resulting liquid crystal display panel 1, an electrically conductive film made of material other than the described material may be adopted.

It is not necessary that the source wirings 12, 13 and 14 are arranged in a form of a ladder, and other arrangements may be equally adopted. As long as the source wirings to be adopted in the liquid crystal display panel in accordance with the present invention are composed of a plurality of wiring sections, and a plurality of wiring paths can be formed by connecting respective parts of the wiring sections, the arrangement of the source wirings is not particularly limited.

Figure 6:
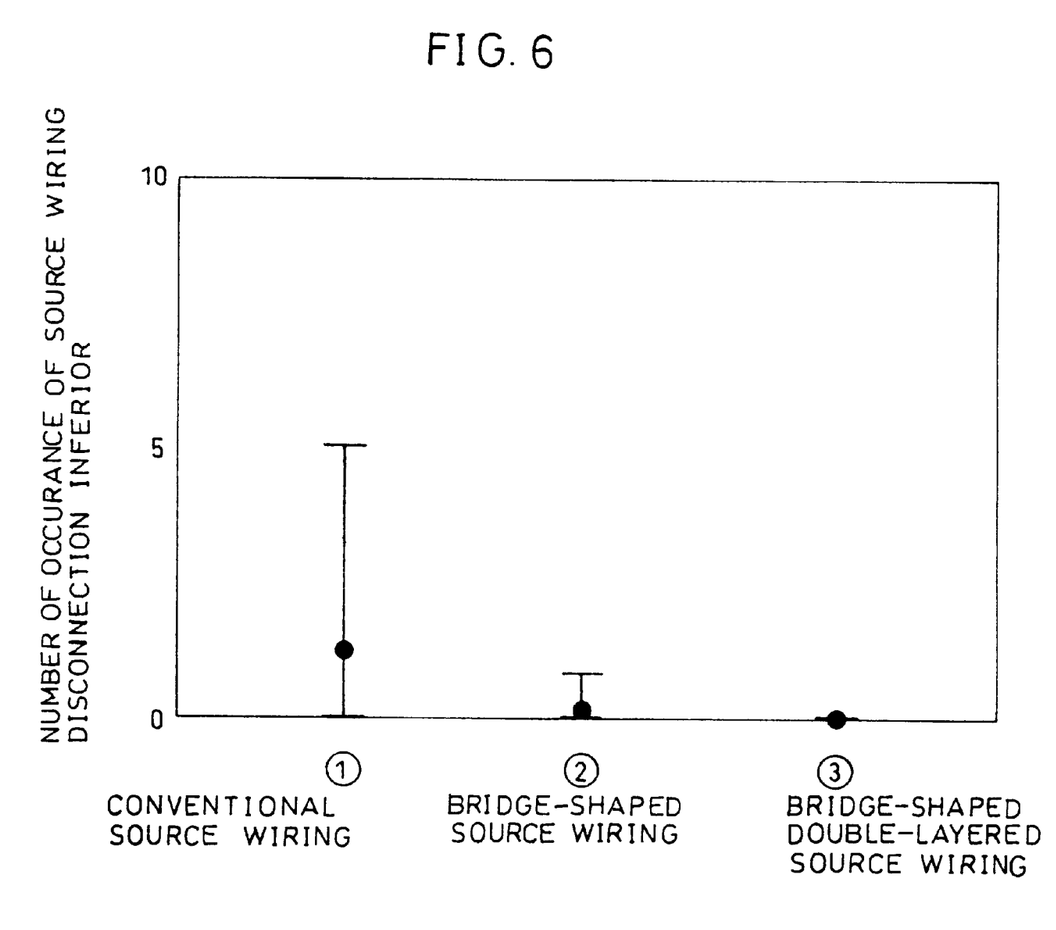
FIG. 6 is a graph showing an occurrence of a disconnection inferior with respect to a source wiring pattern of the present invention and a source wiring pattern of the conventional arrangement.

28-inch size liquid crystal display panels 1 were actually prepared with respect to ① the conventional source wiring pattern, ② the source wiring pattern in a form of a ladder in accordance with the present embodiment, and ③ the source wiring pattern in a form of a ladder +a double-layered wiring (a laminated film of a 0.3 μm thick α-Ta layer and a 0.15 μm thick ITO). As a result, as can be seen from the results shown in Table 1 and FIG. 6, compared with the liquid crystal display panel 1 prepared by adopting the conventional source wiring pattern, in the liquid crystal display panels 1 prepared under the conditions ② and ③, an occurrence of a wiring disconnection could be suppressed to ¹⁄₁₀ or below. Especially, in the case of ③, a disconnection inferior of the source wiring were not observed.

TABLE 1

Number of Source Wiring Disconnection Inferiors Occurred on One Substrate

| | MAXIMUM VALUE | MINIMUM VALUE | AVERAGE |
|---|---|---|---|
| CONVENTIONAL WIRING ① | 5 | 1 | 1.2 |
| WIRING IN A FORM | 1 | 0 | 0.1 |

TABLE 1-continued

Number of Source Wiring Disconnection Inferiors
Occurred on One Substrate

|  | MAXIMUM VALUE | MINIMUM VALUE | AVERAGE |
|---|---|---|---|
| OF LADDER ②<br>WIRING IN A FORM OF LADDER + DOUBLE-LAYERED WIRING ③ | 0 | 0 | 0 |

Here, the pixel size and the aperture ratio (a ratio of an area of an opening section [color filter forming area] with respect to an entire area), and the resolution are as shown in the following Table 2.

TABLE 2

Specification of 28-Inch Size LCD Panel

| PIXEL SIZE | 0.88 (mm) × 0.88 (mm) |
|---|---|
| APERTURE RATIO | 35% |
| RESOLUTION | VGA (640*RGB*480) |

Figure 7:
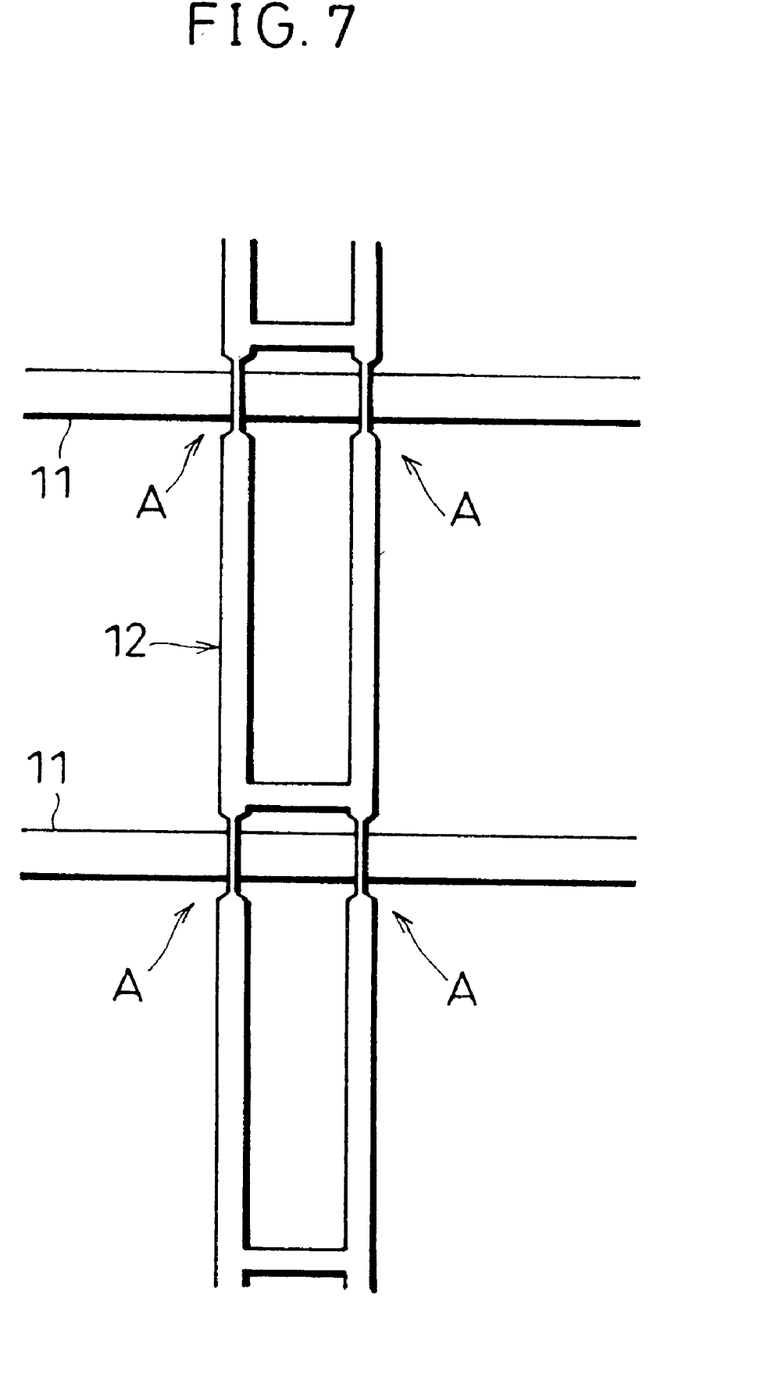
FIG. 7 is a view schematically showing a crossover between wirings when reducing the width of the source wiring.

Each crossover A between the gate wiring 11 and the source wiring 12, 13 or 14 may be arranged so as to allow, for example, the width of the source wiring 12 to be made thinner at the crossover A between the source wiring 12 and the gate wiring 11 as shown in FIG. 7. In the liquid crystal display panel 1 having an upsized display area, a short-circuit inferior increases between the gate wiring 11 and the source wirings 12, 13 and 14 as well as the disconnection inferior of the source wiring 12, 13 or 14. In the arrangement where the width of the source wiring 12 shown in FIG. 7 is reduced, at the crossover A, an area where the gate wirings 11 and the source wiring 12 are overlapped (hereinafter referred to as an overlapped area) can be reduced. As a result, by arranging the source wiring 12 in a form of a ladder, an increase in the sum of an overlapped area at the crossover A between the gate wiring 11 and the source wiring 12 can be suppressed.

Namely, by arranging the source wiring 12 in a form of a ladder, the number of the crossover A increases as compared with the normal wiring pattern, and a sum of overlapped areas also increases. However, by reducing the width of the source wiring 12 at the crossover A, an overlapped area can be reduced, thereby suppressing an occurrence of a short-circuit inferior.

In the area where the overlapped area is reduced, in addition to the described effect of reducing a short-circuit inferior, a parasitic capacity to be generated at the crossover A can be reduced. The described parasitic capacity affects the display data, which impairs the display performances. In the described crossover A, the parasitic capacity increases as the overlapped area between the gate wiring 11 and the source wirings 12, 13 and 14 increases.

As the display area of the liquid crystal display panel 1 is upsized, i.e., as the area of the crossover A increases, an effect of the parasitic capacity increases. However, at the crossover A, by reducing the overlapped area, the parasitic capacity can be reduced, and thus an impairment of the display performances caused by an increase in the size of the screen can be suppressed. Additionally, at the crossover A, the width of the gate wiring 11 can be reduced at the same time. The described arrangement offers the same effect as achieved when reducing the width of the source wirings 12, 13 and 14.

The described liquid crystal display panel 1 in accordance with the present embodiment is designed for an active matrix-type liquid crystal panel wherein TFT elements are formed in a vicinity of the crossover A so as to be enclosed by a matrix formed by the source wirings 12, 13 and 14 for applying a data signal to the source electrodes of the TFT elements and the gate wirings 11 for controlling ON/OFF of the TFT elements. The described liquid crystal display panel 1 is arranged such that the source wirings 12, 13 and 14 are arranged so as to allow a plurality of paths to be formed for supplying a data signal to the TFT elements as desired in other regions than the opening section.

Here, it is preferable that the source wirings 12, 13 and 14 are arranged in a form of a ladder, and it is preferable that the source wirings 12, 13 and 14 are formed by a laminated layer of a plurality of electrically conductive films.

According to the described arrangement, even if a disconnection occurs in one path, an electrical conduction can be achieved from other path than the disconnected path. Namely, by the redundancy of a plurality of paths and the redundancy of a laminated wiring, the redundancy of the wiring as a whole is increased, and an occurrence of the wiring disconnection can be reduced. As a result, the liquid crystal display panel 1 can be manufactured at an improved yield.

It is essentially preferable that the width of at least one of the source wirings 12, 13 and 14 or the gate wiring 11 is reduced at the crossover A. According to the described arrangement, an increase in an area of the crossover between the source wirings 12, 13 and 14 and the gate wiring 11 can be suppressed. Namely, an increase in short-circuit inferior between the source wirings 12, 13 and 14 and the gate wiring 11, an increase in parasitic capacity to be generated at the crossover A can be suppressed. Therefore, since a plurality of data signal transmission paths are formed, even when the number of the source wirings 12, 13 and 14 increases which cross the gate wiring 11, deterioration of the display performances can be prevented.

In the liquid crystal display panel 1 having the described arrangement of the present embodiment, a delay in gate signal occurred when upsizing the display area can be avoided. Therefore, the high quality of the liquid crystal display device (LCD) adopting the described liquid crystal display panel 1 can be maintained.

In the arrangement of the present embodiment, as the source wirings 12, 13 and 14 are formed in a form of a ladder, an area occupied by the source wirings 12, 13 and 14 on the TFT substrate 2c increases. However, in the liquid crystal display panel 1 adopting the panel connecting system, in order to adjust the pixel pitch at the joint 5 with the pixel pitch at other portion, the black matrix 4 is formed relatively wide on purpose.

Therefore, the source wirings 12, 13 and 14 arranged in a form of a ladder may be formed within the region of the black matrix 4. Therefore, the described arrangement of the present embodiment is suited for use in the liquid crystal display panel 1 of an upsized display area that can be difficult to be manufactured without adopting the panel connecting system.

However, the present invention is applicable to not only the liquid crystal display panels of the panel connecting system and those having an upsized display area but also to the liquid crystal panels which permit the conditions of providing the black matrix which increases an area of the display pixels and which is wide enough to cover the source wirings arranged in a form of a ladder. According to the described arrangement, a liquid crystal display panel adopts an upsized display area by connecting two liquid crystal panels; however, a number of liquid crystal panels to be connected is not limited to two, and more than two liquid crystal panels may be connected.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A liquid crystal display panel, comprising:
   a pair of transparent substrates placed so as to face each other;
   a plurality of pixel electrodes formed on one of said pair of transparent substrates;
   a light shielding section formed to surround each of said plurality of pixel electrodes;
   a plurality of active elements connected to said plurality of pixel electrodes respectively;
   source wirings connected to said plurality of pixel electrodes via said active elements, each of said source wirings being composed of a plurality of wiring sections which are connected so as to provide a plurality of different signal paths to the active elements connected thereto; and
   gate wirings formed so as to cross said source wirings, said gate wirings being connected to said pixel electrodes via said active element.

2. The liquid crystal display panel as set forth in claim 1, wherein:
   said plurality of source wirings are arranged in a form of a ladder.

3. The liquid crystal display panel as set forth in claim 1, wherein:
   said plurality of source wirings are formed by a laminated layer of a plurality of electrically conductive films.

4. The liquid crystal display panel as set forth in claim 3, wherein:
   said plurality of electrically conductive films are made of the same material as that adopted in said plurality of pixel electrodes.

5. The liquid crystal display panel as set forth in claim 1, wherein:
   at least a width of said source wirings or said gate wiring is reduced at a crossover where respective wirings cross each other.

6. The liquid crystal display panel as set forth in claim 1, wherein said source wirings are enclosed within an area of said light shielding section.

7. A liquid crystal display panel, comprising:
   a plurality of active matrix type liquid crystal panels, each of said plurality of active matrix type liquid crystal panels including:
      a pair of transparent substrates placed so as to face each other;
      a plurality of pixel electrodes formed on one of said pair of transparent substrates;
      a light shielding section formed to surround each of said plurality of pixel electrodes;
      a plurality of active elements connected to said plurality of pixel electrodes respectively;
      source wirings connected to said plurality of pixel electrodes via said active elements, each of said source wirings being composed of a plurality of wiring sections which are connected so as to provide a plurality of different signal paths to the active elements connected thereto; and
      gate wirings formed so as to cross said source wirings, said gate wirings being connected to said pixel electrodes via said active elements respectively,
         wherein the plurality of active matrix type liquid crystal panels are connected adjacently side to side on a plane to form one large-sized panel.

8. The liquid crystal display panel as set forth in claim 7, wherein:
   said plurality of source wirings are arranged in a form of a ladder.

9. The liquid crystal display panel as set forth in claim 7, wherein:
   said plurality of source wirings are formed by a laminated layer of a plurality of electrically conductive films.

10. The liquid crystal display panel as set forth in claim 9, wherein:
    said plurality of electrically conductive films are made of the same material as that adopted in said plurality of pixel electrodes.

11. The liquid crystal display panel as set forth in claim 7, wherein:
    at least a width of said source wirings or said gate wirings is reduced at a crossover where respective wirings cross each other.

12. The liquid crystal display panel as set forth in claim 7, further comprising:
    a transparent bonding agent layer prepared on one surface of said large panel; and
    a reinforcing substrate laminated on said large-sized panel via said transparent bonding agent layer.

13. The liquid crystal display panel as set forth in claim 6, wherein:
    a width of a joint at which said plurality of liquid crystal panels are connected to form said large-sized panel is not more than a distance between display pixels in said liquid crystal panels.

14. The liquid crystal display panel as set forth in claim 7, further comprising:
    a pair of polarization plates formed on both front and back surfaces of said large panel in such a manner that respective polarization axes cross at a right angle.

15. The liquid crystal display panel as set forth in claim 6, wherein said source wirings are enclosed within an area of said light shielding section.

16. A liquid crystal display panel, comprising:
    a pair of transparent substrates placed so as to face each other;
    a plurality of pixel electrodes formed on one of said pair of transparent substrates;
    a plurality of active elements connected to said plurality of pixel electrodes respectively;
    a plurality source wirings connected to said pixel electrodes via said plurality of active elements, said plurality of source wirings being arranged in a form of a ladder;
    gate wirings formed so as to cross said source wirings, said gate wirings being connected to said pixel electrodes via said active elements.

17. The liquid crystal display panel as set forth in claim 16, further comprising:
    a light shielding section formed to cover regions surrounding said plurality of pixel electrodes including the regions in which said source wirings are formed.

18. The liquid crystal display panel as set forth in claim 16, wherein at least one of said gate wirings and said source wirings have reduced widths at the respective crossings of said gate wirings and said source wirings.

19. A liquid crystal display device, comprising two or more of the liquid crystal panels of claim 16 arranged side-by-side.

20. A liquid crystal display panel comprising:
first and second transparent substrates arranged with inner surfaces thereof facing each other;
gate wirings formed on the inner surface of said first transparent substrate;
source wirings formed on the inner surface of said first transparent substrate and extending so as to cross said gate wirings;
pixel electrodes formed on the inner surface of said first transparent substrate; and
switching elements each having a first terminal connected to one of said source wirings, a second terminal connected to one of said pixel electrodes and a control terminal connected to one of said gate wirings,
wherein each of said source wirings comprises one or more layers of conductive material, at least one of said layers being configured to provide redundant signal paths to the switching elements connected thereto.

21. The liquid crystal display panel as set forth in claim 20, wherein the width of at least one of said gate wirings and said source wirings is reduced at the respective crossings of said gate wirings and said source wirings.

22. The liquid crystal display panel as set forth in claim 20, wherein said source wirings comprise an $\alpha$-Ta layer and an ITO layer.

23. The liquid crystal display panel as set forth in claim 20, wherein the at least one layer of said source wirings comprises parallel source wiring sections which are connected by connecting portions extending therebetween.

24. The liquid crystal display panel as set forth in claim 20, further comprising:
a light shielding section formed to cover regions surrounding said plurality of pixel electrodes including the regions in which said source wirings are formed.

25. A liquid crystal display device comprising two or more of the liquid crystal display panels as set forth in claim 20 arranged side-by-side.

* * * * *